US011337172B2

United States Patent
Kim et al.

(10) Patent No.: US 11,337,172 B2
(45) Date of Patent: May 17, 2022

(54) METHOD FOR TRANSMITTING OR RECEIVING SIDELINK SYNCHRONIZATION SIGNAL IN WIRELESS COMMUNICATION SYSTEM AND APPARATUS THEREFOR

(71) Applicant: LG ELECTRONICS INC., Seoul (KR)

(72) Inventors: Myoungseob Kim, Seoul (KR); Hanbyul Seo, Seoul (KR); Youngtae Kim, Seoul (KR); Seungmin Lee, Seoul (KR); Jaewook Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/610,900

(22) PCT Filed: Mar. 22, 2018

(86) PCT No.: PCT/KR2018/003370
§ 371 (c)(1),
(2) Date: Mar. 11, 2020

(87) PCT Pub. No.: WO2018/174602
PCT Pub. Date: Sep. 27, 2018

(65) Prior Publication Data
US 2021/0014813 A1 Jan. 14, 2021

Related U.S. Application Data

(60) Provisional application No. 62/548,409, filed on Aug. 22, 2017, provisional application No. 62/548,906, (Continued)

(51) Int. Cl.
*H04W 56/00* (2009.01)
*H04W 88/04* (2009.01)
*H04W 92/18* (2009.01)

(52) U.S. Cl.
CPC ........ *H04W 56/0015* (2013.01); *H04W 88/04* (2013.01); *H04W 92/18* (2013.01)

(58) Field of Classification Search
CPC .. H04W 56/0015; H04W 88/04; H04W 92/18
See application file for complete search history.

(56) References Cited

U.S. PATENT DOCUMENTS

2016/0044618 A1* 2/2016 Sheng ................. H04W 56/001
370/329
2016/0302250 A1* 10/2016 Sheng .................... H04W 4/70
(Continued)

FOREIGN PATENT DOCUMENTS

| WO | 2015065768 | 5/2015 |
| WO | 2016164823 | 10/2016 |
| WO | 2016182597 | 11/2016 |

OTHER PUBLICATIONS

3Gpp TS 23.303 V12.3.0; Technical Specification; 3rd Generation Partnership Project; Technical Specification Group Services and System Aspects; Proximity-based Services (ProSe); Stage 2 (Release 12) (Dec. 2014) (Year: 2014).*
(Continued)

*Primary Examiner* — Ankur Jain
*Assistant Examiner* — Angelica M Perez
(74) *Attorney, Agent, or Firm* — Lee Hong Degerman Kang Waimey

(57) ABSTRACT

The present disclosure provides a method for transmitting and receiving a sidelink synchronization signal (SLSS) in a wireless communication system. In detail, the method performed by a first terminal includes receiving configuration information related to the SLSS; receiving the SLSS from a second terminal; determining whether the received SLSS is an SLSS related to sidelink communication or an SLSS related to sidelink discovery based on the received configuration information; and transmitting the received SLSS
(Continued)

when the received SLSS is the SLSS related to sidelink discovery. Through this, the method proposed in the present disclosure has the effect of reducing unnecessary battery consumption of the first terminal and minimizing interference in the terminals of the neighboring cell.

7 Claims, 10 Drawing Sheets

Related U.S. Application Data filed on Aug. 22, 2017, provisional application No. 62/543,962, filed on Aug. 10, 2017, provisional application No. 62/500,552, filed on May 3, 2017, provisional application No. 62/474,619, filed on Mar. 22, 2017.

(56) References Cited

U.S. PATENT DOCUMENTS

| | | |
|---|---|---|
| 2016/0338055 A1 | 11/2016 | Yang et al. |
| 2018/0098370 A1* | 4/2018 | Bangolae .............. H04W 76/27 |

OTHER PUBLICATIONS

PCT International Application No. PCT/KR2018/003370, Written Opinion of the International Searching Authority dated Jul. 19, 2018, 16 pages.

* cited by examiner

[FIG. 1]
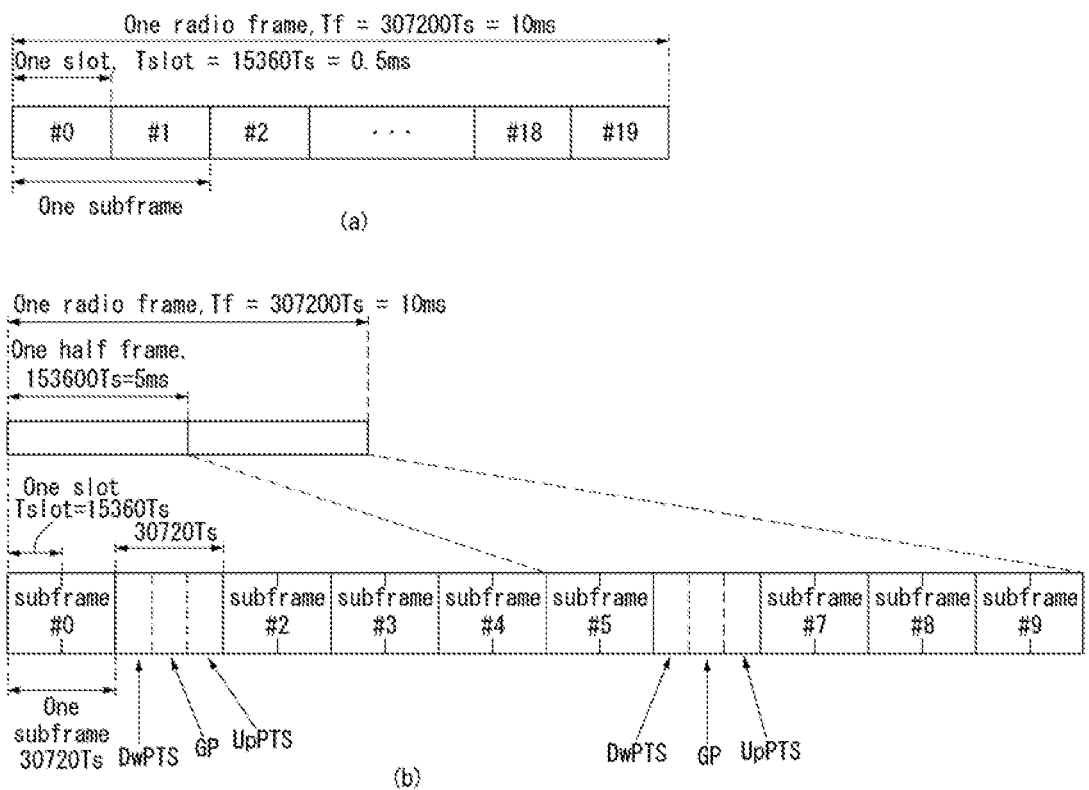

[FIG. 2]
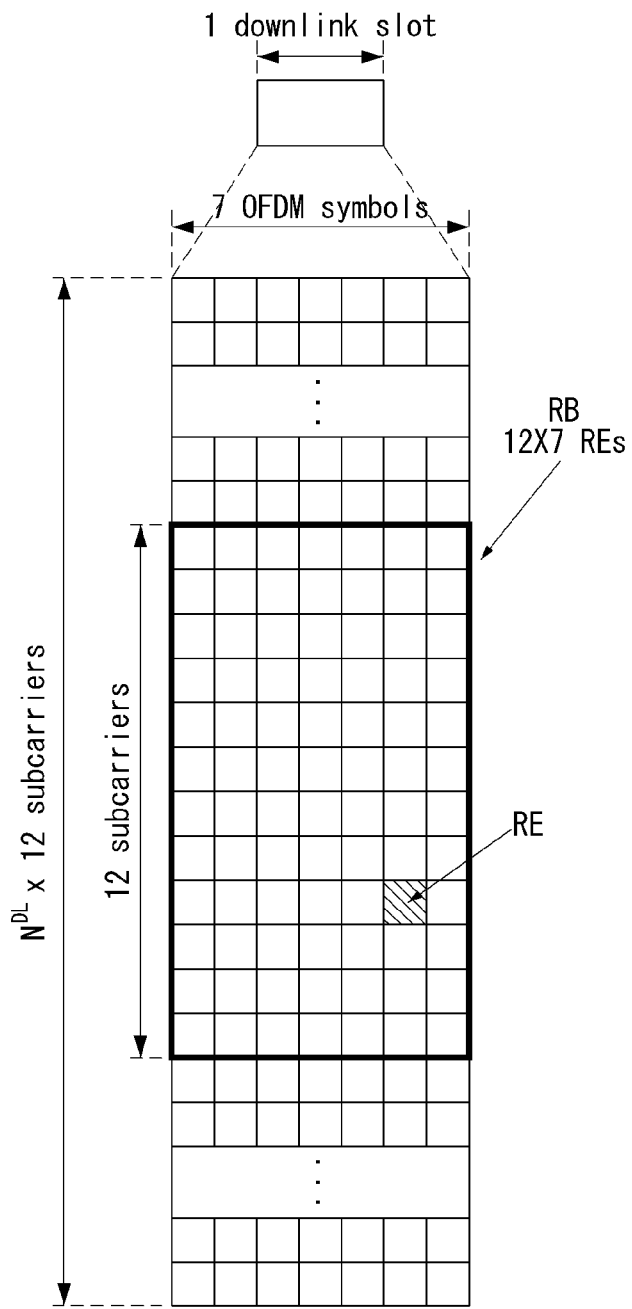

[FIG. 3]
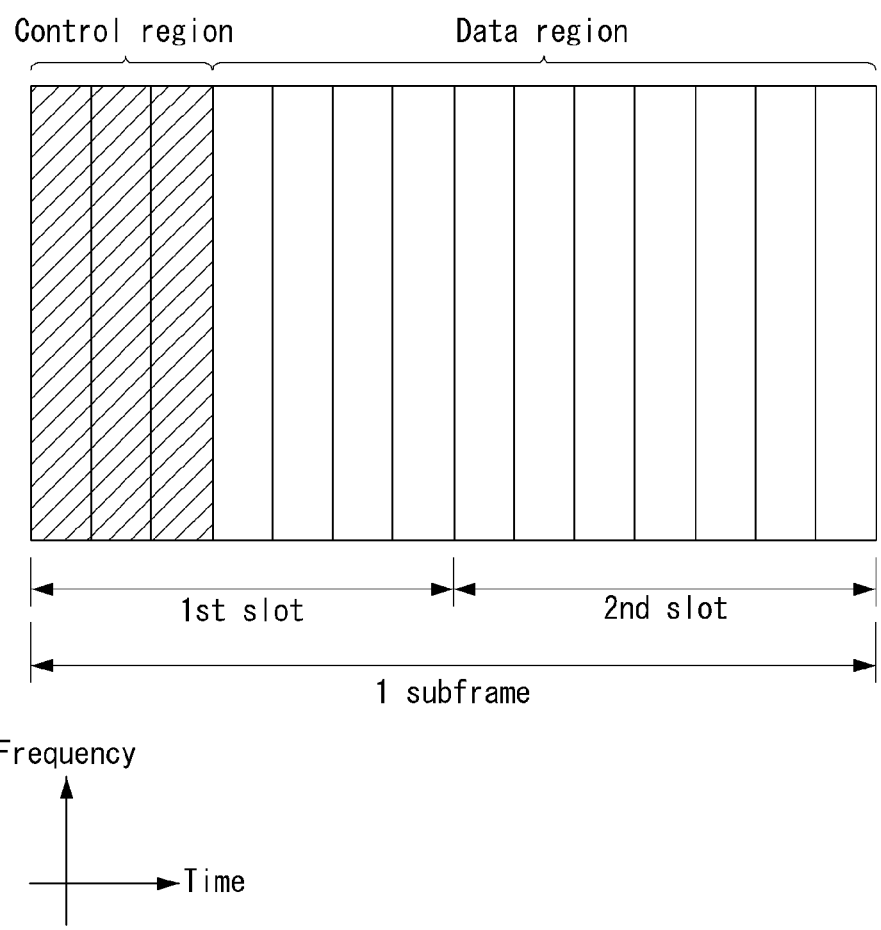

[FIG. 4]
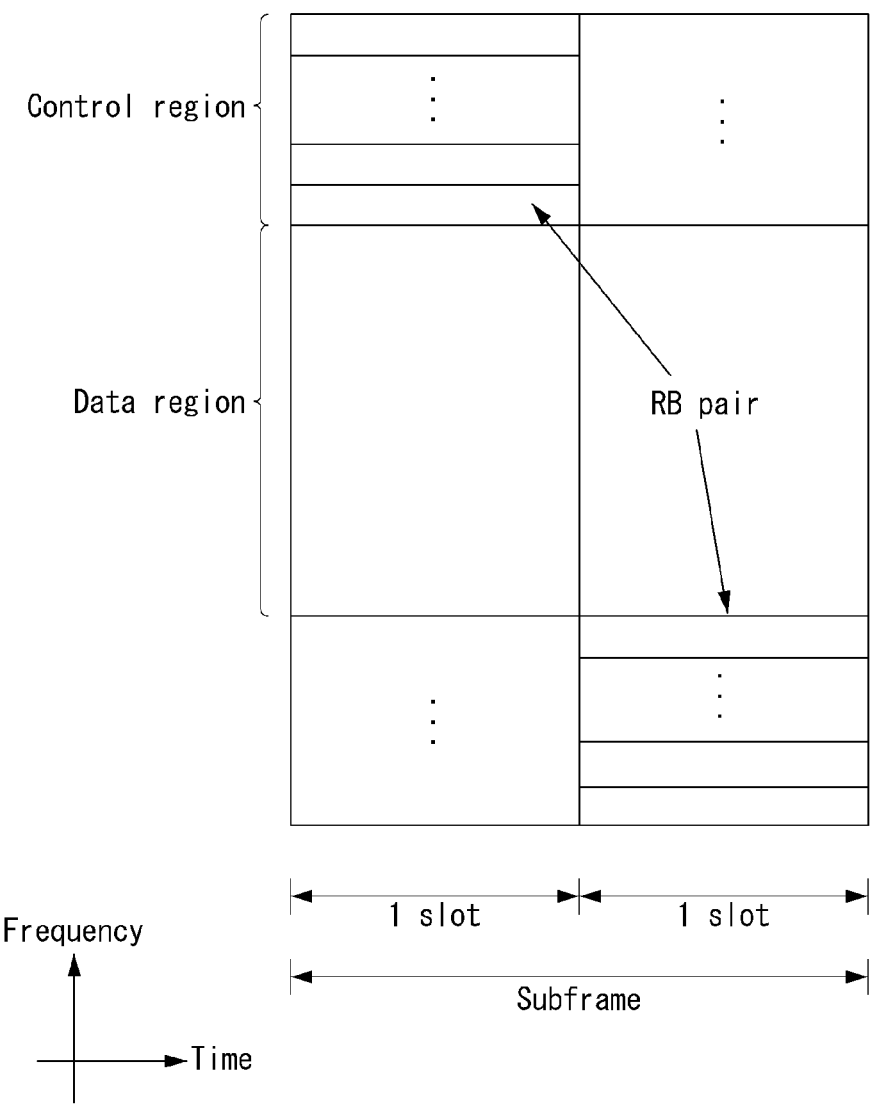

[FIG. 5]
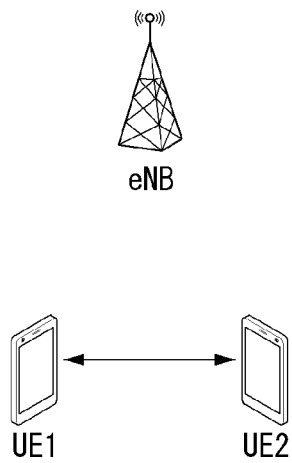
[FIG. 6]
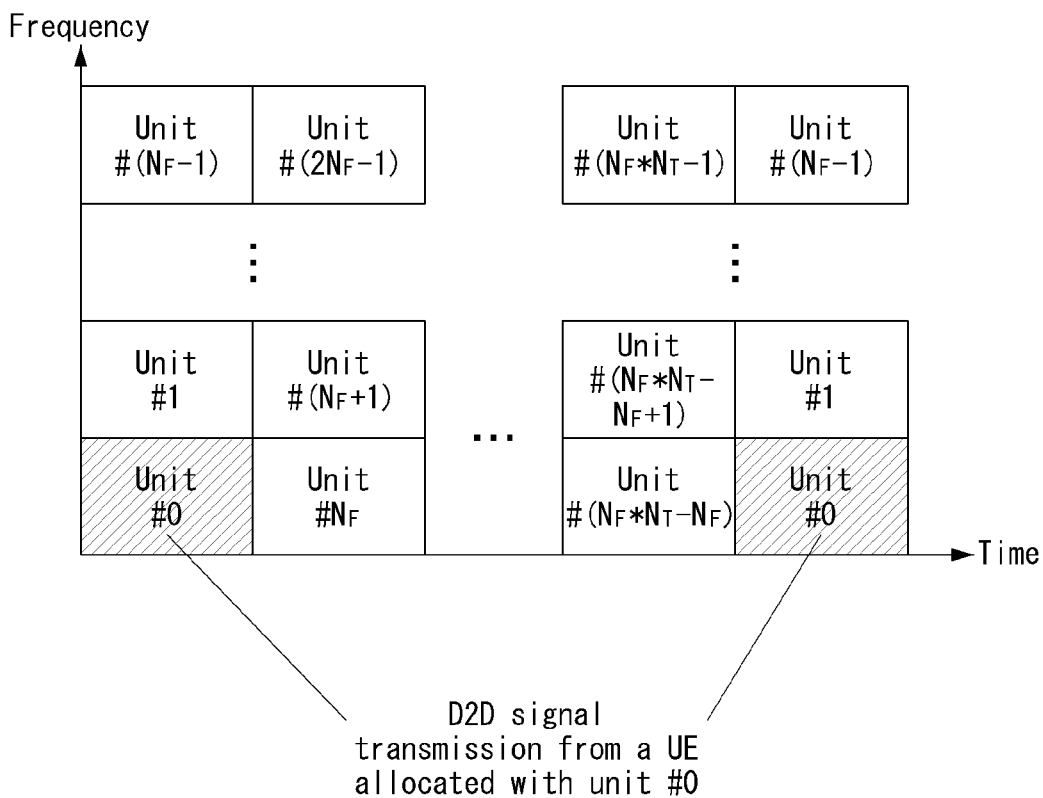

[FIG. 7]
(a) 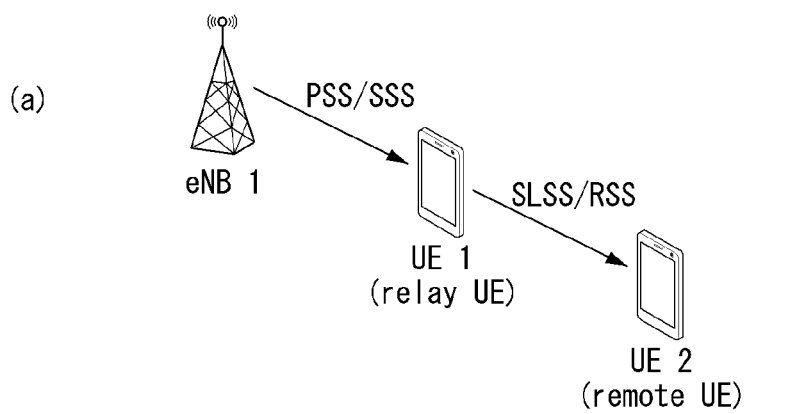
(b) 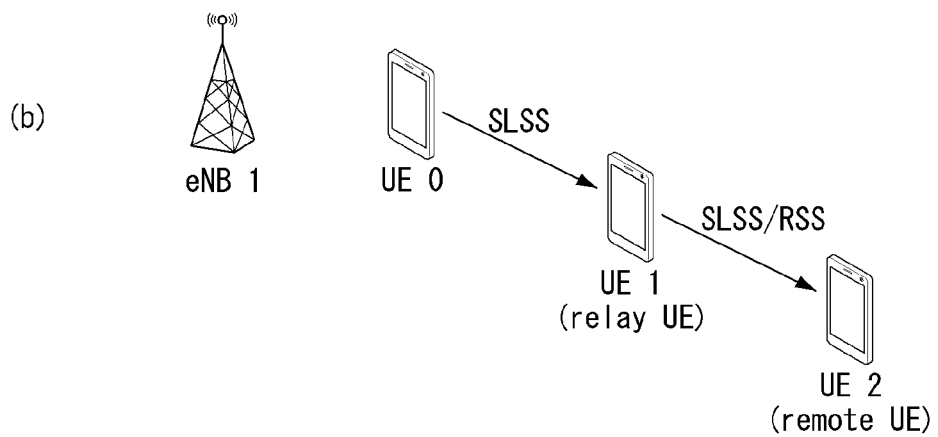

【FIG. 8】
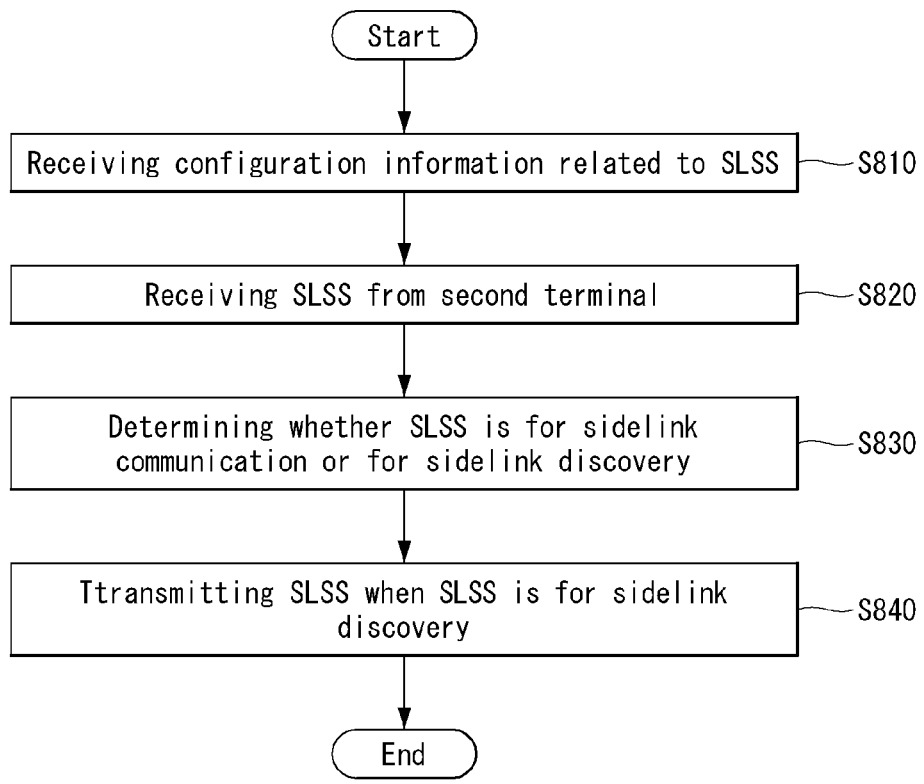
【FIG. 9】
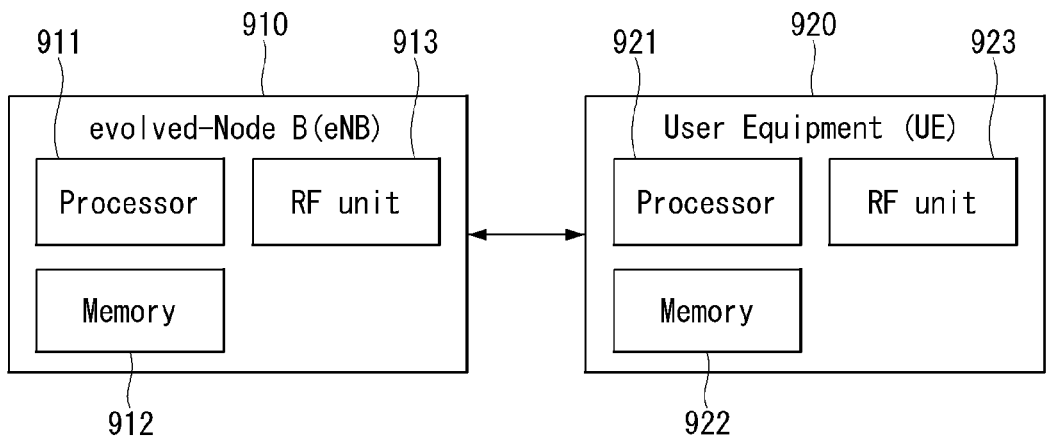

[FIG. 10]
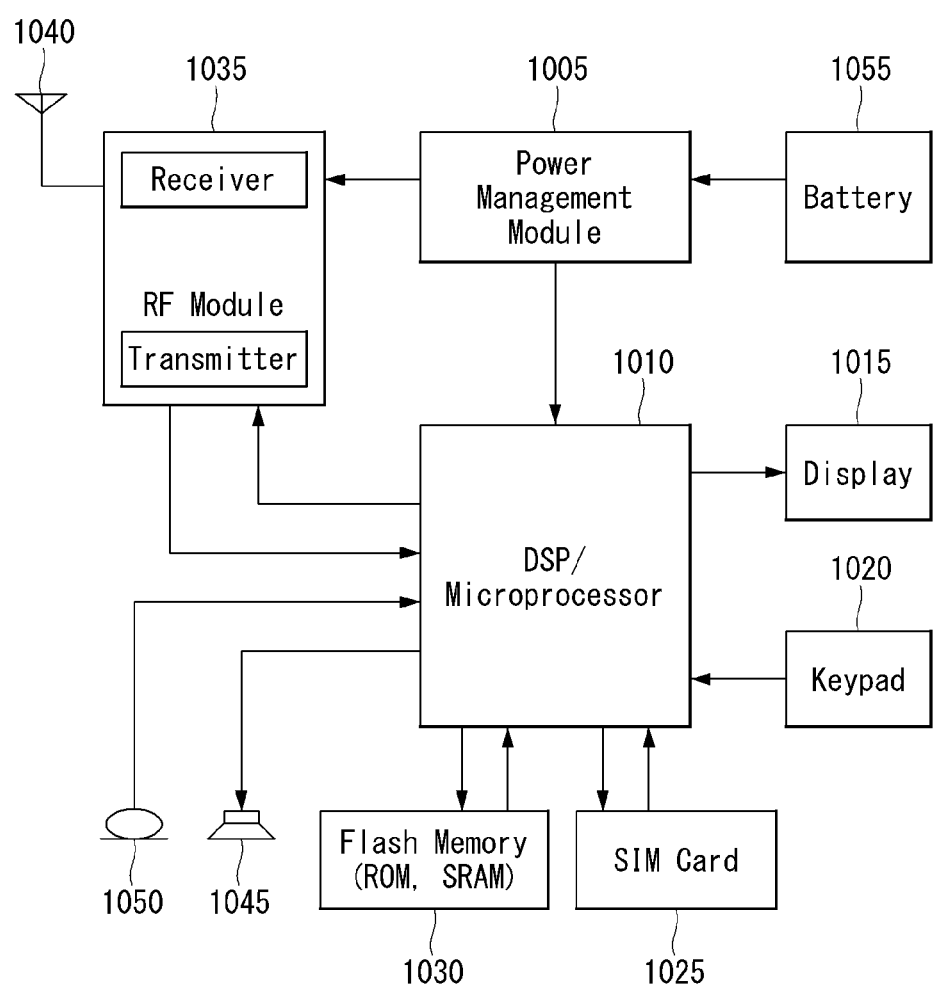

[FIG. 11]
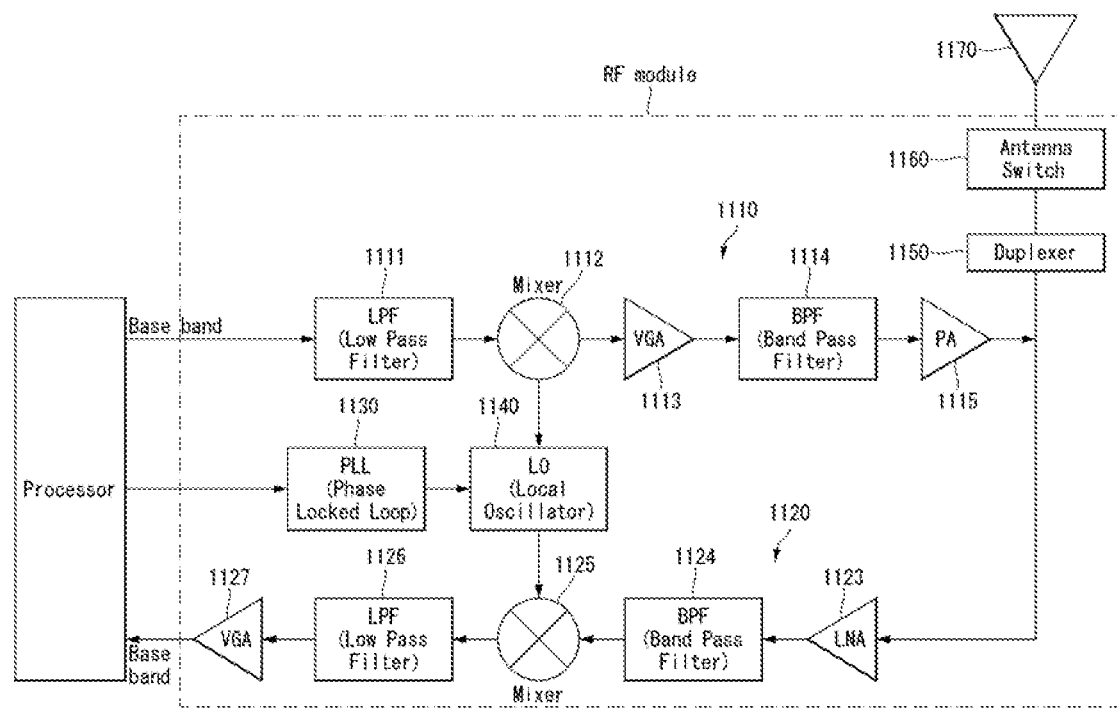

[FIG. 12]
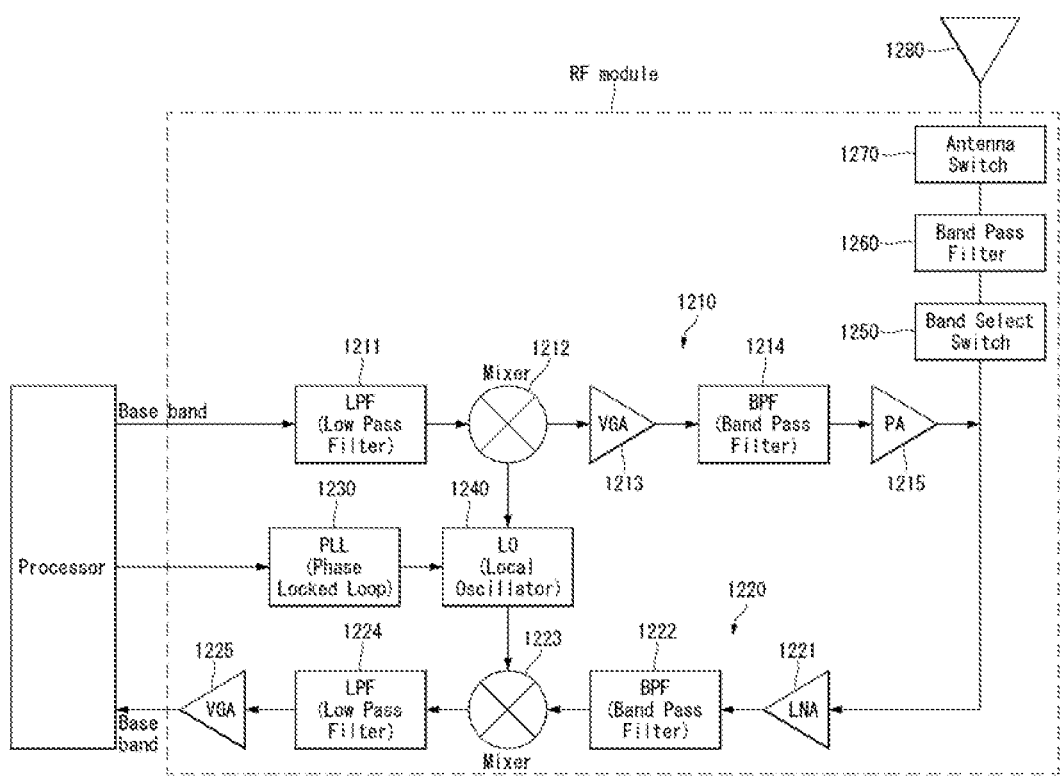

METHOD FOR TRANSMITTING OR RECEIVING SIDELINK SYNCHRONIZATION SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/003370, filed on Mar. 22, 2018, which claims the benefit of U.S. Provisional Application Nos. 62/474,619, filed on Mar. 22, 2017, 62/500,552, filed on May 3, 2017, 62/543,962, filed on Aug. 10, 2017, 62/548,906, filed on Aug. 22, 2017, and 62/548,409, filed on Aug. 22, 2017, the contents of which are all incorporated by reference herein in their entirety.

TECHNICAL FIELD

The present disclosure relates to a wireless communication system supporting sidelink, and more particularly, to a method for transmitting and receiving a sidelink synchronization signal (SLSS) and a device for supporting the same.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

DETAILED DESCRIPTION OF INVENTION

Technical Problem

An object of the present disclosure is to provide a method of reducing power consumption of a remote user equipment (UE) and reducing interference in UEs in neighboring cells by allowing only an SLSS for sidelink discovery to be transmitted from the remote UE.

Technical objects to be achieved by the present disclosure are not limited to the aforementioned technical objects, and other technical objects not described above may be evidently understood by a person having ordinary skill in the art to which the present disclosure pertains from the following description.

Technical Solution

In one aspect of the present disclosure, a method for transmitting and receiving a sidelink synchronization signal (SLSS) in a wireless communication system, the method performed by a first terminal includes receiving configuration information related to the SLSS; receiving the SLSS from a second terminal; determining whether the received SLSS is an SLSS related to sidelink communication or an SLSS related to sidelink discovery based on the received configuration information; and transmitting the received SLSS when the received SLSS is the SLSS related to sidelink discovery.

In addition, in the present disclosure, the configuration information related to the SLSS may include information on a time at which the SLSS is transmitted, information on a resource to which the SLSS is transmitted, and information on a type of the SLSS.

In addition, in the present disclosure, the type of the SLSS may represent the SLSS related to sidelink communication or the SLSS related to sidelink discovery.

In addition, in the present disclosure, the configuration information related to the SLSS may be received from a base station or from the second terminal.

In addition, in the present disclosure, the first terminal may be a terminal operating in a low power mode.

In addition, in the present disclosure, the first terminal may be a remote user equipment (UE), and the second terminal may be a relay UE.

In another aspect of the present disclosure, a first terminal for transmitting and receiving a sidelink synchronization signal (SLSS) in a wireless communication system, the first terminal includes a radio frequency (RF) module for transmitting and receiving a radio signal; and a processor functionally connected with the RF module, wherein the processor is configured to: receive configuration information related to the SLSS; receive the SLSS from a second terminal; determine whether the received SLSS is an SLSS related to sidelink communication or an SLSS related to sidelink discovery based on the received configuration information; and transmit the received SLSS when the received SLSS is the SLSS related to sidelink discovery.

Advantageous Effects

In the present disclosure, only an SLSS for sidelink discovery is transmitted from a remote user equipment (UE), thereby reducing power consumption of the remote UE and reducing interference in UEs in neighboring cells.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included as part of the description to help understand the present disclosure, provide an embodiment of the present disclosure, and describe the technical features of the present disclosure together with the description.

FIG. 1 illustrates a structure of a radio frame in a wireless communication system to which the present disclosure can be applied.

FIG. 2 is a diagram illustrating a resource grid for one downlink slot in a wireless communication system to which the present disclosure can be applied.

FIG. 3 illustrates a structure of a downlink subframe in a wireless communication system to which the present disclosure can be applied.

FIG. 4 illustrates a structure of an uplink subframe in a wireless communication system to which the present disclosure can be applied.

FIG. 5 is a diagram for describing elements of a device-to-device (D2D) communication technique.

FIG. 6 is a diagram illustrating an embodiment of a configuration of a resource unit.

FIG. 7 illustrates an example of a UE-to-UE relay method proposed in the present disclosure.

FIG. 8 is a flowchart illustrating an example of a terminal operation for implementing a method proposed in the present disclosure.

FIG. 9 illustrates a block diagram of a wireless communication device to which methods proposed in the present disclosure can be applied.

FIG. 10 illustrates a block diagram of a communication device according to an embodiment of the present disclosure.

FIG. 11 is a diagram illustrating an example of an RF module of a wireless communication device to which a method proposed in the present disclosure can be applied.

FIG. 12 is a diagram illustrating another example of an RF module of a wireless communication device to which a method proposed in the present disclosure can be applied.

MODE FOR INVENTION

Hereinafter, preferred embodiments of the present disclosure will be described in detail with reference to the accompanying drawings. A detailed description to be disclosed below together with the accompanying drawing is to describe embodiments of the present disclosure and not to describe a unique embodiment for carrying out the present disclosure. The detailed description below includes details in order to provide a complete understanding. However, those skilled in the art know that the present disclosure can be carried out without the details.

In some cases, in order to prevent a concept of the present disclosure from being ambiguous, known structures and devices may be omitted or may be illustrated in a block diagram format based on core function of each structure and device.

In the specification, a base station means a terminal node of a network directly performing communication with a terminal. In the present disclosure, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present disclosure and the use of the specific terms may be modified into other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present disclosure may be based on standard documents disclosed in at least one of IEEE 802, 3GPP, and 3GPP2 which are the wireless access systems. That is, steps or parts which are not described to definitely show the technical spirit of the present disclosure among the embodiments of the present disclosure may be based on the documents. Further, all terms disclosed in the document may be described by the standard document.

3GPP LTE/LTE-A is primarily described for clear description, but technical features of the present disclosure are not limited thereto.

General System

FIG. 1 illustrates a structure a radio frame in a wireless communication system to which the present disclosure can be applied.

In 3GPP LTE/LTE-A, radio frame structure type 1 may be applied to frequency division duplex (FDD) and radio frame structure type 2 may be applied to time division duplex (TDD) are supported.

In FIG. 1, the size of the radio frame in the time domain is represented by a multiple of a time unit of $T\_s=1/(15000*2048)$. The downlink and uplink transmissions are composed of radio frames having intervals of $T\_f=307200*T\_s=10$ ms.

FIG. 1(*a*) illustrates the type 1 radio frame structure. The type 1 radio frame may be applied to both full duplex FDD and half duplex FDD.

The radio frame includes 10 subframes. One radio frame includes 20 slots each having a length of $T\_slot=15360*T\_s=0.5$ ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) illustrates the type 2 radio frame structure. The type 2 radio frame structure includes 2 half frames each having a length of 153600*T_s=5 ms. Each of the half frames includes 5 subframes each having a length of 30720*T_s=1 ms.

In the type 2 radio frame structure of a TDD system, an uplink-downlink configuration is a rule showing how uplink and downlink are allocated (or reserved) with respect to all of subframes. Table 1 represents the uplink-downlink configuration.

TABLE 1

| Uplink-Downlink configuration | Downlink-to-Uplink Switch-point periodicity | \multicolumn{10}{c}{Subframe number} |||||||||||
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "T_slot=15360*T_s=0.5 ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 represents a configuration (i.e., the length of a DwPTS/GP/UpPTS) of the special subframe.

TABLE 2

| Special subframe configuration | Normal cyclic prefix in downlink ||| Extended cyclic prefix in downlink |||
|---|---|---|---|---|---|---|
| | | \multicolumn{2}{c}{UpPTS} | | \multicolumn{2}{c}{UpPTS} |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

FIG. 2 is a diagram illustrating a resource grid for one downlink slot in the wireless communication system to which the present disclosure can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present disclosure is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present disclosure can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Enhanced PDCCH (EPDCCH) carries UE-specific signaling. The EPDCCH is located in a physical resource block (PRB) that is set to be terminal specific. In other words, as described above, the PDCCH can be transmitted in up to three OFDM symbols in the first slot in the subframe, but the EPDCCH can be transmitted in a resource region other than the PDCCH. The time (i.e., symbol) at which the EPDCCH in the subframe starts may be set in the UE through higher layer signaling (e.g. RRC signaling, etc.).

The EPDCCH is a transport format, a resource allocation and HARQ information associated with the DL-SCH and a transport format, a resource allocation and HARQ information associated with the UL-SCH, and resource allocation information associated with SL-SCH (Sidelink Shared Channel) and PSCCH Information, and so on. Multiple EPDCCHs may be supported and the terminal may monitor the set of EPCCHs.

The EPDCCH can be transmitted using one or more successive advanced CCEs (ECCEs), and the number of ECCEs per EPDCCH can be determined for each EPDCCH format.

Each ECCE may be composed of a plurality of enhanced resource element groups (EREGs). EREG is used to define the mapping of ECCE to RE. There are 16 EREGs per PRB pair. All REs are numbered from 0 to 15 in the order in which the frequency increases, except for the RE that carries the DMRS in each PRB pair.

The UE can monitor a plurality of EPDCCHs. For example, one or two EPDCCH sets may be set in one PRB pair in which the terminal monitors the EPDCCH transmission.

Different coding rates can be realized for the EPCCH by merging different numbers of ECCEs. The EPCCH may use localized transmission or distributed transmission, which may result in different mapping of the ECCE to the REs in the PRB.

FIG. 4 illustrates a structure of an uplink subframe in the wireless communication system to which the present disclosure can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

D2D (Device-to-Device) Communication

FIG. 5 is a diagram for describing elements of a D2D (device-to-device) communication technique.

In FIG. 5, a UE means a terminal of a user, but when network equipment such as an eNB transmits and receives a signal according to a communication method with the UE, the corresponding network equipment may also be regarded as a kind of UE. Hereinafter, UE1 may operate to select a resource unit corresponding to a specific resource in a resource pool representing a set of resources and transmit a D2D signal using the corresponding resource unit. UE2, which is a receiving UE, configures a resource pool through which UE1 can transmit a signal, and detects a signal of UE1 within the corresponding pool. Here, the resource pool may be informed by the base station when UE1 is in the connection range of the base station, and may be determined by another UE or determined as a predetermined resource when it is outside the connection range of the base station. In general, a resource pool may include a plurality of resource units, and each UE may select one or a plurality of resource units to use for transmitting their D2D signals.

FIG. 6 is a diagram illustrating an embodiment of a configuration of a resource unit.

Referring to FIG. 6, a total frequency resource is divided into N_F and a total time resource is divided into N_T, so that the total number of N_F*N_T resource units may be defined. In this case, it can be expressed that the resource pool is repeated every N_T subframes. Specifically, one resource unit may be expressed periodically and repeatedly as shown in the figure. Alternatively, in order to obtain a diversity effect in a time or frequency dimension, an index of a physical resource unit to which one logical resource unit is mapped may change in a predetermined pattern according to time. In this resource unit structure, a resource pool may mean a set of resource units that can be used for transmission by a UE that intends to transmit a D2D signal.

The resource pool described above may be subdivided into several types. First, resource pools may be classified according to contents of D2D signals transmitted from each resource pool. As an example, the contents of the D2D signal may be classified as follows, and a separate resource pool may be configured, respectively.

Scheduling assignment (SA): A signal containing information such as a location of a resource for a transmission of a D2D data channel performed by each transmitting UE, a modulation and coding scheme (MCS), or MIMO transmission method, and/or timing advance required for demodulation of other data channels. This signal may be multiplexed and transmitted together with D2D data on the same resource unit, and the SA resource pool in the present disclosure may mean a pool of resources transmitted by multiplexing the SA with D2D data, and another name may be called a D2D control channel.

D2D data channel: A resource pool used by a transmitting UE to transmit user data using resources specified through SA. When it is possible to transmit multiplexed data with D2D data on the same resource unit, the resource pool for the D2D data channel may be a form in which only the D2D data channel having the form except for the SA information is transmitted. In other words, the resource elements used to transmit SA information on individual resource units in the SA resource pool may still be used to transmit D2D data in the D2D data channel resource pool.

Discovery channel: The resource pool for a message that allows a transmitting UE to transmit information, such as its ID, so that a neighboring UE can discover the transmitting UE itself.

Contrary to the above case, even when the content of the D2D signal is the same as each other, different resource pools may be used according to the transmission/reception attributes of the D2D signal. As an example, even in the same D2D data channel or discovery message, based on a transmission timing determination method of a D2D signal (for example, whether it is transmitted at the time of receiving a synchronization reference signal or is transmitted by applying a constant timing advance from the time) or a resource allocation method (for example, whether the eNB assigns transmission resources of an individual signal to an individual transmitting UE or whether an individual transmitting UE selects an individual signaling resource on its own within a pool), a signal format (for example, the number of symbol of each D2D signal occupies in one subframe, or the number of subframes used to transmit one D2D signal), signal strength from eNB, and transmit power strength of the D2D UE, it may be again divided into different resource pools.

In the present disclosure, for convenience of explanation, in D2D or V2V communication, a method in which eNB directly indicates transmission resources of D2D transmitting UE is called/defined as Mode 1 or Mode 3 and a method in which the transmission resource region is set in advance or the eNB assigns the transmission resource region and the UE directly selects the transmission resource is called/defined as ode 2 or Mode 4. In case of D2D discovery, the case that the eNB directly indicates a resource is called/defined as Type 2 and the case that a UE directly selects a transmission resource in a predetermined resource region or a resource region indicated by the eNB is called/defined as Type 1.

The above-mentioned D2D may be called sidelink, and SA may be called as a physical sidelink control channel (PSCCH), a D2D synchronization signal may be called as a sidelink synchronization signal (SSS), and a control channel that transmits the most basic information before D2D communication and transmitted with SSS may be called a physical sidelink broadcast channel (PSBCH), or another name, a PD2DSCH (Physical D2D synchronization channel). A signal for notifying that a specific terminal is in the vicinity thereof, in which case the signal may include an ID of the specific terminal, and this channel may be called a physical sidelink discovery channel (PSDCH).

In Rel. 12 D2D, only the D2D communication UE transmits the PSBCH together with the SSS, and thus the measurement of the SSS is performed by using the DMRS of the PSBCH. The out-coverage UE measures the DMRS of the PSBCH and measures the reference signal RSRP (reference signal received power) of this DMRS to determine whether the UE itself is to be a synchronization source.

Hereinafter, it will be described a method for performing synchronization in a relay situation between the UEs proposed in the present disclosure.

More specifically, the present disclosure provides a method for performing synchronization in a UE-UE relay situation in which a UE transmits signals to another UE.

FIG. 7 illustrates an example of a UE-to-UE relay method proposed in the present disclosure.

FIG. 7(a) illustrates a method in which UE 1 corresponding to a relay UE receives a signal of an eNB (a donor eNB) and relays it to UE 2 corresponding to a remote UE.

In FIG. 7(a), a backhaul link may be a band (or link) in which an eNB and a UE communicate with each other, and an access link may be the same band as the backhaul link or a band (or link) for performing UE-to-UE communication.

The band in which the eNB and the UE communicate with each other may be, for example, an LTE uplink/downlink.

The band for performing UE-to-UE communication may be, for example, a sidelink or a D2D link.

FIG. 7(b) illustrates a method, as another example of a UE-to-UE relay, in which UE 1 corresponding to a relay UE receives a signal of UE 0 (donor UE) and relay it to UE 2 corresponding to a remote UE.

In the same manner as in FIG. 7(a), when the UE 1 is transparent to the UE 2, that is, when relaying is performed in a manner in which the UE 2 does not recognize the existence of the UE 1, both the UE 1 and the UE 2 may acquire timing information from an eNB synchronization signal (or a synchronization signal equivalent to the eNB).

In the same manner as in FIG. 7(a), when the UE 1 is not transparent to the UE 2, that is, when relaying is performed in a manner in which the UE 2 can recognize the existence of the UE 1, the UE 2 may acquire timing from a synchronization signal transmitted from the UE 1.

For convenience of description hereinafter, a synchronization signal transmitted by the UE (UE-to-UE) rather than the eNB is referred to as 'sidelink synchronization signal (SLSS)', and a synchronization signal relayed by the UE (UE-to-UE) will be expressed as 'RSS' among the SLSS.

Of course, the RSS signal may be the same type and the same timing (PSS/SSS) as the synchronization signal of the eNB, or the same type/timing as the SLSS.

Similarly to FIG. 7(a), in the same manner as FIG. 7(b), the UE 2 may acquire timing from the synchronization signal of the eNB or from the SLSS or the RSS transmitted from the UE 0 or the UE 1.

For example, assume that both the UE 1 and the UE 2 are within the coverage of the same eNB (eNB 1) in FIG. 7(a).

The eNB (eNB 1) may perform configuration for synchronization signal transmission of respective UEs.

That is, the configuration may include a time at which an SLSS synchronization signal related to UE-to-UE is transmitted, a resource to be transmitted, and a kind (or type)/content, etc. of the synchronization signal.

For example, a time at which a specific UE transmits a synchronization signal may be the same timing as the synchronization signal of the eNB or a time at which a constant offset is applied from the timing.

The constant offset may be a value that advances timing by UL TA (Timing Advance).

Alternatively, when the specific UE does not want the synchronization signal of the eNB to be detected at the same time as the synchronization signal of the eNB, the offset value or the absolute value of the offset may be set sufficiently large (for example, advancing the timing by more than several symbols or several subframes than the UL TA).

In addition, a resource to which the synchronization signal of the specific UE is to be transmitted also needs to be defined in advance to detect the synchronization signal of the specific UE in a state in which it is not synchronized to the specific UE.

For example, a resource corresponding to a center 6 resource block (RB) of a specific band may be used as an SLSS (synchronization) resource.

The synchronization signal may transmit the content of the synchronization signal of the eNB as it is (for example, UEs in direct communication between UEs may acquire or confirm a physical cell ID (PCID), etc.) or may be transmitted in a separate SLSS form (for example, enabling SLSS ID acquisition or confirm).

In another embodiment, after the transmission of the SLSS, a broadcasting channel (e.g. PSBCH) may be transmitted to the UE(s).

In this case, when a physical sidelink broadcast channel (PSBCH) for D2D of Rel. 12 and Rel. 13 and a PSBCH for further enhanced D2D (FeD2D) (or future system) of Rel. 15 are the same, the FeD2D of Rel. 15 or the SLSS for future next generation systems does not need to be distinguished from the D2D of Rel. 12 and Rel. 13.

When a D2D UE and a FeD2D UE transmit the SLSS having the same identifier (ID), that is, when the D2D UE and the FeD2D UE transmit the SLSS of the same structure, each UE may obtain the effect of receiving signals by single frequency network (SFN) with each other.

On the other hand, the PSBCH for the FeD2D may additionally include information for the FeD2D. Information for the FeD2D may be mapped through some reserved bits of the PSBCH.

However, when information such as information for the FeD2D is not mapped in the PSBCH for the D2D (e.g. zero padding), the PSBCHs of the D2D UE and the FeD2D UE may not be SFN with each other, and may act as interference in each UE.

Accordingly, in order to solve the above problem, the network (when additional information for the FeD2D is included in the PSBCH) may map the corresponding information to the PSBCH for the D2D at the same location and transmit the same.

In this manner, the UE can receive the PSBCH for the D2D and the PSBCH for the FeD2D in a SFN manner, and the SLSS for Rel. 15 FeD2D or the SLSS for future systems does not need to be distinguished from the SLSS of Rel. 12/13 D2D.

As described above, even if UEs in a coverage of a specific eNB receive information on the SLSS from a base station (or even if it is defined for SLSS transmission in advance), not all UEs need to transmit the SLSS.

That all UEs transmit the SLSS may not only be unnecessary power consumption, but also increase interference in neighboring UEs and reduce available resources by that many UEs transmit synchronization signals.

Since the specific UE transmits the synchronization signal and then additional Tx-Rx switching gap is required before the specific UE changes a mode to a reception mode, this part may also act as an overhead.

In particular, since UEs (for example, UEs having a limited number of receiving antennas that use or can use a narrow band, such as an MTC UE, or UEs that need to limit any signal transmission and reception to a minimum with low power/ultra low power) subject to constraints on system bandwidth or max data rate, etc. supported among the UEs may be burdened by the synchronization signal transmission itself, the SLSS transmission can be restricted or skipped.

Accordingly, selective transmission of the SLSS may be necessary for the above-described reasons.

As an example, whether to transmit the SLSS may be determined according to the UE type.

Referring to FIG. 7, there may be three types of UEs, and each type may be a relay UE (UE 1), a remote UE (UE 2), and a normal UE (UE 0) that does not belong to either the relay UE or the remote UE.

In this case, for example, the relay UE may be configured to transmit the SLSS in the form of a relay synchronization signal (RSS).

The relay UE must perform not only an operation of transmitting data directly generated by itself and an operation of receiving data necessary for itself, but also a role of transmitting data required by other UEs (remote UEs).

Accordingly, the relay UE corresponds to a UE type that is difficult to operate at the low power/ultra low power as described above.

However, whether or not the SLSS is transmitted may not significantly affect the overall power consumption. Whether the relay UE uses the SLSS or information on the SLSS transmission related to the SLSS resource, etc. may be indicated to the UEs through the SIB, etc.

In addition, for the same reason, the relay UE may be considered to be in an RRC connected state with the eNB for a longer time (or more frequently) than at least other types of UEs (e.g. remote UEs).

Accordingly, it may be desirable for the eNB to indicate the information on the SLSS transmission to the relay UE through dedicated signaling or the like.

For example, the eNB may indicate the SLSS transmission to the UE semi-statically through RRC signaling, etc. or dynamically through physical layer signaling, etc. In this case, the indication information on the SLSS transmission indicated by the SIB may be overridden.

On the other hand, it may be desirable that the remote UE receiving the SLSS through the relay UE is configured not to transmit the corresponding SLSS again.

Such a configuration may be dynamically transmitted to the UE through an RRC message, a physical channel, etc. or semi-persistently transmitted to the UE through the SIB.

For example, the system information block (SIB) for the relay UE and the remote UE may include resource-related configuration information for synchronization.

In this case, when the relay UE as well as the remote UE do not include resource information for the synchronization on the corresponding SIB, the remote UE or the relay UE may not transmit the SLSS.

In another example, the SIB for the relay UE and the SIB for the remote UE may be distinguished from each other. That is, when the SIB for the remote UE does not include the resource information for the synchronization, the remote UE may not transmit the SLSS.

Likewise, when the SIB for the relay UE does not include the resource information for the synchronization, the relay UE may not transmit the SLSS.

In addition, the normal UEs (not the relay UEs or the remote UEs) may also be configured to transmit the SLSS.

These normal UEs may also acquire the information on the SLSS transmission through the SIB or the dedicated signaling or the like. However, when the normal UEs are UEs subject to constraints on system bandwidth or maximum data rate, etc. supported by the MTC UE or UEs operating in a low power mode, the normal UEs may be configured not to transmit the SLSS.

To this end, for example, when operation modes of the UE are divided into a total of N modes according to the degree of power usage of the UE, the upper n modes ($0<=n<=N$) may be divided into low power modes. Here, N means a natural number.

However, when the remote UE also performs discovery every predetermined period, the remote UE may be defined to transmit the SLSS for the discovery.

In addition, since the MTC UE, etc. also need to continuously notify the neighboring UEs of the location, connection status, presence through discovery signal transmission, etc., the MTC UE, etc. may also be defined to transmit the SLSS for the discovery.

For example, there may be a case where an associated relay UE (L-UE 1) and a UE (M-UE 2) other than a remote UE (M-UE 1) may disconnect association with the originally-associated relay UE (L-UE 2), and may need to associate with another (relay) UE.

At this time, when the M-UE 1 relays the SLSS (and/or associated discovery signal, etc.) for the discovery of the L-UE 1 and transmits it in the SFN manner, the M-UE 2 may attempt to change the relay by measuring the corresponding SLSS (and/or associated discovery signal, etc.).

'A and/or B' described in the present disclosure may be interpreted to have the same meaning as 'including at least one of A or B'.

As another example, there may be a case where the remote UE (M-UE 1) must disconnect association with the associated relay UE (L-UE 1) and associate with another (relay) UE (L-UE 2).

At this time, another (relay) UE (L-UE 2) may receive the SLSS (and/or associated discovery signal, etc.) for the discovery of the remote UE (M-UE 1) to perform a discovery signal and a new association.

As another example, even when the (potential) relay UE (L-UE 1) and the (potential) remote UE (M-UE 1) before association belong to different cells, the remote UE (M-UE 1) may perform a relay association operation by transmitting the SLSS (and/or associated discovery signal, etc.) for the discovery.

As another example, only UEs satisfying a specific condition may be defined to transmit the SLSS.

When a plurality of UEs simultaneously transmit the SLSS, UEs transmitting the same SLSS may obtain SFN effects or coverage extension effects, etc.

However, for a UE transmitting different types of the SLSS at the same time, it can only act as interference.

For example, assuming that a specific SLSS retransmits the eNB synchronization signal, the UE 1 or the UE 2 of FIG. 7 transmits a synchronization signal of the eNB 1 at a cell boundary, which may affect synchronization acquisition of UEs in a neighboring cell.

Accordingly, the following methods can be considered to reduce the effect of interference due to the transmission of the SLSS in this situation.

First, in a situation in which (in coverage) UEs belonging to the specific eNB transmit the SLSS, when a reception sensitivity (e.g. RSSI) of the synchronization signal of the eNB received from a cell (serving cell) to which the specific UE belongs must be equal to or greater than a specific threshold (e.g. X1), and a largest value among the reception sensitivity of the synchronization signal of the eNB received from the neighboring cell is equal to or less than a specific threshold (e.g. X2), the UE may transmit the SLSS.

That is, this is to prevent the SLSS transmitted (or retransmission of the synchronization signal of the eNB) by the UE belonging to a specific cell from affecting the UEs belonging to the neighboring cell.

For this, $X1>=X2$ must be satisfied, and when the power on which the UE transmits (the SLSS) is 'P_UE', it may be desirably $X1=X2+P\_UE$.

As described above, although the synchronization signal of the serving cell eNB and the synchronization signal of the neighboring cell eNB may be compared, the SLSS received in the serving cell and the SLSS received from the neighboring cell may be compared to determine whether the UE receives the SLSS.

Next, in performing group cast/group communication, etc. between the UEs, a specific UE (e.g. representative UE) or some UEs of a specific group may transmit the SLSS.

In this case, the SLSS may also act as interference to UEs in a neighboring group. Therefore, a reception sensitivity (e.g. RSSI) of the SLSS received from the group to which the specific UE belongs must be equal to or greater than a specific threshold (e.g. X1), when a largest value among the reception sensitivity of the SLSS received from the neighboring group is equal to or less than a specific threshold (e.g. X2), the UE may transmit the SLSS.

That is, this is to prevent the SLSS transmitted by the UE belonging to the specific group from affecting the UEs belonging to the neighboring group.

For this, X1>=X2 must be satisfied, and when the power on which the UE transmits (the SLSS) is 'P_UE', it may be desirably X1=X2+P_UE.

The following is a brief summary of the above-description.

That is, the following are related to the synchronization aspect for further enhancement LTE D2D (FeD2D).

First, an in-coverage relay UE may be supported as a synchronization source for an in-coverage remote UE.

Hereafter, it will be considered some issues related to the synchronization for the FeD2D.

1. SLSS Transmission of Remote UE

In a FeD2D scenario, the remote UE may receive synchronization signals and data from a linked relay UE (or eNB). Here, the UEs may be configured to transmit the SLSS for discovery and communication.

However, this may be a burden on some UEs, so not all UEs need to transmit the SLSS.

For example, for UEs (e.g. the remote UE) that use narrow bands (e.g. 1 RB or 6 RB) or do not have the ability to transmit high-speed data, physical resources are very sparse and even a small amount of resources for transmitting the SLSS may be a burden.

In general, since the battery power of the UE (especially small wearable devices) in the mobile environment is limited, it is necessary to reduce unnecessary signal transmission and power consumption for the UE.

When the UE returns from an SLSS transmission mode to a sidelink data reception mode, a guard interval may be required and may also be treated as an additional overhead for the UE.

In addition, assuming that the remote UE is a wearable device and the relay UE is its control device (e.g. a smartphone or a tablet PC, etc.), the UEs may be in close proximity and it may not be effective for both the relay UE and the remote UE to transmit the SLSS.

Assuming a case of one relay UE versus a plurality of remote UEs, since the remote UE is able to communicate sufficiently through the relay UE, not directly between the remote UEs, there is no need to exchange the SLSS between the remote UEs.

Accordingly, in a relay mode, the relay UEs are configured to transmit the SLSS for communication with the remote UEs (e.g. using the SIB or the dedicated signaling). The remote UE does not need to transmit the SLSS for power efficiency and for communication.

However, in a case of the discovery, the period of transmission of the discovery signal is sufficiently longer than the period of sidelink communication, and the SLSS transmission for discovery, which occurs once in every discovery period, may not be a heavy burden on the remote UE.

In fact, it may be necessary for another UE to find a specific remote UE.

For example, it may be the case that the relay UE and the remote UE belong to another cell before association, or a UE other than the relay UE attempts to find the remote UE for potential change of the associated relay.

Considering this, it is not excluded that the remote UE transmits the SLSS for discovery in a situation where the remote UE does not transmit the SLSS for communication.

As a method of defining such an operation, the signaling of the synchronization resource for the remote UE is expected to be separated from the SIB for other UEs including the relay UEs due to differences in supported system bandwidth.

Therefore, if it is assumed that the remote UE whose bandwidth is limited does not transmit any SLSS, the network simply cannot provide the SLSS resource to the remote UE, which does not affect the spec.

Assuming that the remote UE whose bandwidth is limited transmits the SLSS only for discovery, since the current spec. does not support such an operation, it should support the operation of the corresponding UE.

That is, a first proposal is that the remote UE does not transmit the SLSS for communication but transmits the SLSS for discovery.

2. Condition of Prioritizing SLSS of Relay UE with Highest Priority

In a relaying mode, the relay UE needs to receive the eNB synchronization signal with the highest priority. There are at least two options of the synchronization signal that the remote UE can receive.

One option is the eNB synchronization signal and the other option is the SLSS.

Unlike the relay UE, the remote UE does not need to receive the eNB synchronization signal with the highest priority.

Assuming that the remote UE prioritizes the eNB synchronization signal, the relay UE and the remote UE may be arranged in different eNBs. That is, the relay UE lies in the eNB 1, the remote UE lies in an eNB 2, and the remote UE will follow the timing criteria of the eNB 2.

In this case, since the remote UE does not know whether the relay UE is located in the same cell, it attempts to decode a sidelink signal from a plurality of resource pools with different timings.

This will increase the battery consumption of the remote UE. Therefore, it may be more desirable for the remote UE to prioritize the SLSS of the linked relay UE.

When the SLSS of the relay UE is prioritized, the remote UE can decode the sidelink signal from the resource pool related to the relay UE even when both the relay UE and the remote UE move to the neighboring cell, as in the case of group handover.

In particular, when all signals and data necessary or relayed during the relaying operation can be relayed by the relay UE, it is desirable to configure the remote UE to receive the SLSS at the highest priority from the relay UE.

When the SLSS of the relay UE is not detected, it is natural for the remote UE to receive the eNB synchronization signal as the next priority, and the remote UE may be changed to communicate directly with the eNB instead of the relaying scheme.

It can be further discussed as to whether the SLSS of the relay UE has the highest priority in all situations, and it is necessary to specify when the remote UE should prioritize the SLSS of the relay UE.

For example, when the remote UE needs to communicate (or exchange signals and data) with the eNB during the relaying mode or before the remote UE is linked with the relay UE, the remote UE may be configured to receive the eNB synchronization signal with the highest priority, such as a method of designating an existing ProSe and/or V2X SLSS priority.

The remote UE may be configured to follow other priority rules than ProSe and/or V2X according to the (pre)configuration by the network after the remote UE is linked with the relay UE.

This means that the remote UE is configured to receive the SLSS from the linked relay UE with the highest priority that may be interpreted that an SLSS ID of the linked relay UE is not only different from the SLSS ID of the eNB, but also has a higher priority than the SLSS ID of other UEs.

In this case, for example, the SLSS ID information of the relay UE may be indicated to the remote UE through the PSDCH (or PSSCH).

That is, a second proposal is that the remote UE may be configured to give priority to the SLSS of the relay UE with the highest priority after being associated with the relay UE.

3. SLSS Differentiation Between ProSe and FeD2D

When the contents of the PSBCH and the physical channel format are the same between the ProSe and the FeD2D, these can be combined in the SFN manner and can also improve reception performance. Therefore, it is not desirable to distinguish the PSBCH of the ProSe and the FeD2D.

However, in the case of the FeD2D, additional information about relay operation may need to be transmitted to the PSBCH. If the corresponding information on the FeD2D is indicated by the reserved bit of the PSBCH, the above-described SFN effect does not occur, and the PSBCHs of the ProSe and the FeD2D will appear as interference with each other.

To avoid this, the network may set the reserved bit of the ProSe PSBCH to be the same as the reserved bit of the FeD2D PSBCH (used to indicate the additional information).

In general, the resources of the SLSS are related to the resources of the PSBCH. In the case of the V2X, since the PSBCH format is different, the SLSS of the V2X can be distinguished, and when the ProSe UE can avoid the decoding attempt of the PSBCH for the V2X, it is possible to save the battery of the UE.

In the case of the FeD2D, since the same PSBCH format is used as the ProSe, in practice, it is desirable to allow the SLSS of the same ID to be combined together in the SFN.

That is, a third proposal is that it is not necessary to distinguish between the SLSS of the ProSe and the FeD2D.

In addition, in the case of the following two types of UE types that are previously set or signaled, after performing link set-up with the relay UE, the SLSS (timing) of the (linked) relay UE may be regarded as a higher synchronization priority than the synchronization signal (or timing) of the eNB (always).

(1) UE with limited RX chain capability (or UE sharing RX chain between SL RX and DL RX)

(2) UE with limited band (or narrow-band) capability (of preset (or signaled) size)

In addition, the transmission resource pool (Tx resource pool) will be described.

When the relay UE (L-UE 1) and the (potential) remote UE (M-UE 1) belong to different cells and the corresponding cells are asynchronous, in D2D of the existing Rel. 12 and Rel. 13, L-UE 1 and M-UE 1 each perform a transmission operation according to synchronization timing of their own cell and transmission resource pool information configured by the corresponding cell (e.g. SIB message). That is, no special optimization was done for asynchronous inter-cell situations.

This situation is the case where the synchronization timing of the serving cell/base station is configured as the highest priority order of the synch. reference, when the priority order is changed, the above transmission operation needs to be changed or optimized accordingly.

That is, when the SLSS of the relay UE is configured to the highest priority than the synchronization timing of the serving cell/base station, instead of performing the transmission operation based on Tx resource pool information of the cell to which the remote UE belongs, the remote UE performs the transmission operation according to the Tx resource pool information on the SIB message transmitted by the relay UE (transmitted by the serving cell of the relay UE).

In the D2D operation of the existing Rel. 12 and Rel. 13 as above, since a signal transmitted by the remote UE is transmitted in the Tx resource pool designated by its serving cell, the interference applied to the serving cell is not large.

That is, when the Tx resource pool is present in the same band as the corresponding cell, since the Tx resource pool will be separated from the wireless area network (WAN) communication band of the existing cell, interference can be avoided, and when the Tx resource pool is not in the same band as the corresponding cell but exists in a dedicated carrier or spectrum, resources between UEs using the same resource pool may be controlled to some extent through coordination or sensing in an eNB indicated or UE autonomous manner.

However, in this case, there is a possibility that the remote UE may cause great interference to the relay UE or a cell to which the relay UE belongs. That is, while using different Tx resource pools, when the relay UE or the relay UE does not recognize the Tx resource pool of the remote UE, it is inevitably affected by interference.

In addition, since the timing of symbols and/or subframe boundaries, etc. may be shifted due to the asynchronous state, this may also cause interference.

Of course, when the remote UE performs the transmission operation according to the Tx resource pool information on the SIB message delivered by the relay UE, the opposite of the content described above may occur.

That is, the remote UE may interfere with its serving cell or UEs belonging to the serving cell.

However, in a relaying situation between the relay UE and the remote UE, the Tx power of the remote UE is not determined to increase (or to satisfy a link budget) the reception sensitivity of the signal received by the serving cell (of the relay UE or the remote UE), but rather needs to be determined to increase the reception sensitivity of the signal received by the relay UE.

Thus, for example, the Tx power of the remote UE may be determined by a path loss between the relay UE and the remote UE (to compensate for the path loss).

This method can be effectively applied to the D2D of the Rel. 12 and Rel. 13.

As such, when Tx power and transmission coverage of the remote UE are limited by the relaying operation, interference that may be given to the serving cell (from the remote UE perspective) may be reduced.

In summary of the methods described above, the remote UE may be interpreted as performing the transmission operation according to the Tx resource pool indicated by a target (i.e. the relay UE) of its synchronization reference.

In the above situation, as another method, the remote UE may inform the relay UE of the Tx resource pool information (its ID information may be added) related to (or indicated to) its serving cell, and allow the relay UE to communicate using, if possible, resources that overlap with the Tx resource pool related to (or indicated to) the serving cell of the relay UE.

That is, in the remote UE it is to minimize the impact on its serving cell and the relay UE (and its serving cell).

Alternatively, the remote UE may recommend the SL resource location information (or location information on SL resource candidates) to reduce interference to its serving cell (WAN communication in the same band or SL communication in the dedicated spectrum) to the relay UE.

FIG. 8 is a flowchart illustrating an example of a terminal operation for implementing a method proposed in the present disclosure.

That is, FIG. 8 illustrates an operation method of a terminal for transmitting and receiving a sidelink synchronization signal (SLSS) in a wireless communication system.

Hereinafter, a first terminal refers to the remote UE described in FIG. 7, and a second terminal refers to the relay UE.

First, the first terminal receives configuration information related to the SLSS (S810).

The configuration information related to the SLSS may include at least one of information on a time at which the SLSS is transmitted, information on a resource to which the SLSS is transmitted, or information on a type of the SLSS.

Here, the type (or kind) of the SLSS may represent a SLSS related to sidelink communication or a SLSS related to sidelink discovery.

For example, when the type value of the SLSS is configured to '0', the type of the SLSS may be the SLSS for the sidelink communication, and when the type value of the SLSS is configured to '1', the type of the SLSS may be the SLSS for the sidelink discovery.

In addition, the configuration information related to the SLSS may be received from a base station or received from the second terminal.

As described above, the first terminal refers to the remote UE and may correspond to a terminal operating in a low power mode.

Thereafter, the first terminal receives the SLSS from the second terminal (S820).

Thereafter, the first terminal determines whether the received SLSS is the SLSS related to sidelink communication or the SLSS related to sidelink discovery based on the received configuration information (S830).

Thereafter, the first terminal transmits the received SLSS when the received SLSS is the SLSS related to sidelink discovery (S840).

Basically, although the first terminal does not transmit the SLSS received from the second terminal, when the type of the SLSS is the SLSS for sidelink discovery, the first terminal transmits the SLSS received from the second terminal to at least one terminal.

Overview of Devices to which the Present Disclosure can be Applied

FIG. 9 illustrates a block diagram of a wireless communication device to which methods proposed in the present disclosure can be applied.

Referring to FIG. 9, a wireless communication system includes a base station 910 and a plurality of terminals 920 located in a base station region.

The base station 910 includes a processor 911, a memory 912, and a radio frequency (RF) unit (or RF module) 913.

The processor 911 implements the functions, processes and/or methods proposed in FIGS. 1 to 8 above. Layers of wireless interface protocol may be implemented by the processor. The memory 912, being connected to the processor, stores various types of information for driving the processor. The RF unit 913, being connected to the processor, transmits and/or receives radio signals.

The RF unit may be referred to as an RF unit or an RF module.

The UE 920 includes a processor, a memory, and an RF unit.

The processor implements the functions, processes and/or methods proposed in FIGS. 1 to 8 above. Layers of a wireless interface protocol may be implemented by the processor. The memory 922, being connected to the processor, stores various types of information for driving the processor. The RF unit, being connected to the processor, transmits and/or receives radio signals.

The memory 912, 922 can be installed inside or outside the processor 911, 921 and connected to the processor through various well-known means.

In addition, the base station and/or the UE may have a single antenna or multiple antennas.

FIG. 10 illustrates a block diagram of a communication device according to an embodiment of the present disclosure.

Particularly, FIG. 10 illustrates the UE of FIG. 9 above in more detail.

Referring to FIG. 10, the UE includes a processor (or digital signal processor (DSP)) 1010, an RF module (or RF unit) 1035, a power management module 1005, an antenna 1040, a battery 1055, a display 1015, a keypad 1020, a memory 1030, a subscriber identification module (SIM) card 1025 (which may be optional), a speaker 1045 and a microphone 1050. The UE may include a single antenna or multiple antennas.

The processor 1010 may be configured to implement the functions, processes and/or methods proposed in FIGS. 1 to 8 above. Layers of a wireless interface protocol may be implemented by the processor.

The memory 1030 is connected to the processor and stores information related to operations of the processor. The memory may be located inside or outside the processor and may be connected to the processor through various well-known means.

A user enters command information, such as a telephone number, for example, by pushing (or touching) buttons of the keypad 1020 or by voice activation using the microphone 1050. The processor 1010 receives the command information and processes to perform the appropriate function, such as to dial the telephone number. Operational data may be extracted from the SIM card 1025 or the memory 1030. Furthermore, the processor 1010 may display the command information or operational information on the display 1015 for the user's recognition and convenience.

The RF module 1035 is connected to the processor 1010 to transmit and/or receives an RF signal. The processor 1010 forwards the command information to the RF module 1035, to initiate communication, for example, to transmit radio signals comprising voice communication data. The RF module 1035 is comprised of a receiver and a transmitter for receiving and transmitting radio signals. The antenna 1040 functions to transmit and receive radio signals. Upon receiving the radio signals, the RF module 1035 may forward the signal for processing by the processor 1010 and convert the signal to baseband. The processed signals may be converted into audible or readable information output via the speaker 1045.

FIG. 11 is a diagram illustrating an example of an RF module of a wireless communication device to which a method proposed in the present disclosure can be applied.

Specifically, FIG. 11 illustrates an example of an RF module that may be implemented in a frequency division duplex (FDD) system.

First, in a transmission path, the processor described in FIGS. 9 and 10 processes data to be transmitted and provides an analog output signal to a transmitter 1110.

Within the transmitter 1110, the analog output signal is filtered by a low pass filter (LPF) 1111 to remove images caused by digital-to-analog conversion (ADC), upconverted from baseband to RF by an upconverter (mixer 1112), amplified by a variable gain amplifier (VGA) 1113, and the amplified signal is filtered by a filter 1114, further amplified by a power amplifier (PA) 1115, routed through duplexer(s) 1150/antenna switch(es) 1160, and transmitted through an antenna 1170.

In addition, in a reception path, the antenna 1170 receives signals from the outside and provides the received signals, and these signals are routed through the antenna switch(es) 1160/duplexer(s) 1150 and provided to a receiver 1120.

Within the receiver 1120, the received signals are amplified by a low noise amplifier (LNA) 1123, filtered by a band pass filter 1124, and down converted from RF to baseband by a downconverter (mixer 1125).

The down-converted signal is filtered by a low pass filter (LPF) 1126, amplified by a VGA 1127 to obtain an analog input signal, which is provided to the processor described in FIGS. 9 and 10.

In addition, a local oscillator (LO) generator 1140 generates transmission and reception LO signals and provides them to the upconverter 1112 and the downconverter 1125, respectively.

In addition, a phase locked loop (PLL) 1130 receives control information from the processor to generate the transmission and reception LO signals at appropriate frequencies and provides control signals to the LO generator 1140.

In addition, the circuits shown in FIG. 11 may be arranged differently from the configuration shown in FIG. 11.

FIG. 12 is a diagram illustrating another example of an RF module of a wireless communication device to which a method proposed in the present disclosure can be applied.

Specifically, FIG. 12 illustrates an example of an RF module that may be implemented in a time division duplex (TDD) system.

A transmitter 1210 and a receiver 1220 of the RF module in the TDD system have the same structure as the transmitter and the receiver of the RF module in the FDD system.

Hereinafter, the RF module of the TDD system will be described only for a structure that differs from the RF module of the FDD system, and the description of the same structure will be described with reference to FIG. 11.

A signal amplified by a power amplifier (PA) 1215 of the transmitter is routed through a band select switch 1250, a band pass filter (BPF) 1260, and antenna switch(es) 1270, and transmitted through an antenna 1280.

In addition, in a reception path, the antenna 1280 receives signals from the outside and provides the received signals, and these signals are routed through the antenna switch(es) 1270, the band pass filter 1260, and the band select switch 1250, and provided to the receiver 1220.

In the aforementioned embodiments, the elements and characteristics of the present disclosure have been combined in specific forms. Each of the elements or characteristics may be considered as optional unless otherwise described explicitly. Each of the elements or characteristics may be implemented in a form to be not combined with other elements or characteristics. Furthermore, some of the elements and/or the characteristics may be combined to form an embodiment of the present disclosure. Order of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

INDUSTRIAL APPLICABILITY

The method of performing sidelink communication in the wireless communication system of the present disclosure has been described with reference to the example applied to the 3GPP LTE/LTE-A system, but can be applied to various wireless communication systems.

The invention claimed is:

1. A method for transmitting and receiving a sidelink synchronization signal (SLSS) in a wireless communication system, the method performed by a first terminal comprising:
    receiving configuration information related to the SLSS;
    receiving the SLSS from a second terminal; and
    transmitting the SLSS based on a determination that the SLSS is an SLSS related to sidelink discovery among an SLSS related to sidelink communication and an SLSS related to sidelink discovery based on the configuration information,
    wherein the SLSS is transmitted based on a first reception power of a first synchronization signal received from the base station being equal to or greater than a first threshold and a second reception power of a second synchronization signal received from a neighbor base station being equal to or less than a second threshold.

2. The method of claim 1, wherein the configuration information related to the SLSS includes information on a time at which the SLSS is transmitted, information on a resource to which the SLSS is transmitted, and information on a type of the SLSS.

3. The method of claim 2, wherein the type of the SLSS represents the SLSS related to sidelink communication or the SLSS related to sidelink discovery.

4. The method of claim 1, wherein the configuration information related to the SLSS is received from a base station or from the second terminal.

5. The method of claim 1, wherein the first terminal is a terminal operating in a low power mode.

6. The method of claim 1, wherein the first terminal is a remote user equipment (UE), and the second terminal is a relay UE.

7. A first terminal for transmitting and receiving a sidelink synchronization signal (SLSS) in a wireless communication system, the first terminal comprising:
   a radio frequency (RF) module including a transceiver for transmitting and receiving a radio signal; and
   a processor functionally connected with the RF module, wherein the processor is configured to:
   receive configuration information related to the SLSS;
   receive the SLSS from a second terminal; and
   transmit the SLSS based on a determination that the SLSS is an SLSS related to sidelink discovery among an SLSS related to sidelink communication and an SLSS related to sidelink discovery based on the configuration information,
   wherein the SLSS is transmitted based on a first reception power of a first synchronization signal received from the base station being equal to or greater than a first threshold and a second reception power of a second synchronization signal received from a neighbor base station being equal to or less than a second threshold.

* * * * *